United States Patent
Ock

[19]

[11] Patent Number: 6,166,777
[45] Date of Patent: Dec. 26, 2000

[54] PICTURE-IN-PICTURE TYPE VIDEO SIGNAL PROCESSING CIRCUIT AND METHOD OF USING THE SAME FOR A MULTI-PICTURE DISPLAY CIRCUIT

[75] Inventor: Sang Soo Ock, Kyoungsangbuk-Do, Rep. of Korea

[73] Assignee: LG Electronics Inc., Seoul, Rep. of Korea

[21] Appl. No.: 08/844,990

[22] Filed: Apr. 23, 1997

[30] Foreign Application Priority Data

Apr. 23, 1996 [KR] Rep. of Korea .................. 96-12397

[51] Int. Cl.[7] ............................................... H04N 5/45
[52] U.S. Cl. ................................. 348/565; 348/558
[58] Field of Search .................................. 348/553, 558, 348/565, 568, 584, 554, 556

[56] References Cited

U.S. PATENT DOCUMENTS

| | | | |
|---|---|---|---|
| 4,249,213 | 2/1981 | Imaide | 358/183 |
| 4,317,114 | 2/1982 | Walker | 340/721 |
| 4,673,983 | 6/1987 | Saraguka | 358/3 |
| 4,811,103 | 3/1989 | Casey | 358/183 |
| 4,984,083 | 1/1991 | Okamoto | 358/183 |
| 4,991,013 | 2/1991 | Kobayashi | 358/183 |
| 5,016,106 | 5/1991 | Yong-Je | 358/183 |
| 5,113,259 | 5/1992 | Romesburg et al. | 348/565 |
| 5,315,391 | 5/1994 | Lee | 348/553 |
| 5,455,632 | 10/1995 | Ichihara | 348/565 |
| 5,481,315 | 1/1996 | Matsunaga | 348/565 |
| 5,703,657 | 12/1997 | Maruoka | 348/554 |
| 5,875,000 | 2/1999 | Yamaguchi | 348/564 |
| 5,894,332 | 4/1999 | Yamagishi | 348/564 |
| 5,914,728 | 6/1999 | Yamagishi et al. | 348/568 |
| 5,914,757 | 6/1999 | Dean et al. | 348/564 |
| 5,929,933 | 7/1999 | Takeuchi | 348/564 |

*Primary Examiner*—Victor R. Kostak

[57] ABSTRACT

The PIP type video signal processing circuit for a multi-picture display circuit in which a sub-channel video signal is compressed in accordance with a discriminated mode and a reading period is synchronized with a period of the video signal of a main-picture region when the sub-picture video signal is selectively selected of the TV video signal provided from the TV and the PC video signal provided from the PC. The present invention comprises a mode discriminator/timing generator for discriminating a mode in accordance with a synchronizing signal of a sub-picture video signal, producing a control signal for synchronizing horizontal and vertical frequencies of sub-picture video signal with a main-picture video signal, and separating synchronizing signals from the synchronizing signal of the sub-picture video signal, a video compressor for compressing the input TV video signal or input PC video signal with a predetermined pattern, a dual-port memory for storing the sub-picture video signal provided from the video compressor and outputting the sub-picture video signal by the synchronizing control signal.

4 Claims, 6 Drawing Sheets

FIG. 2
(PRIOR ART)

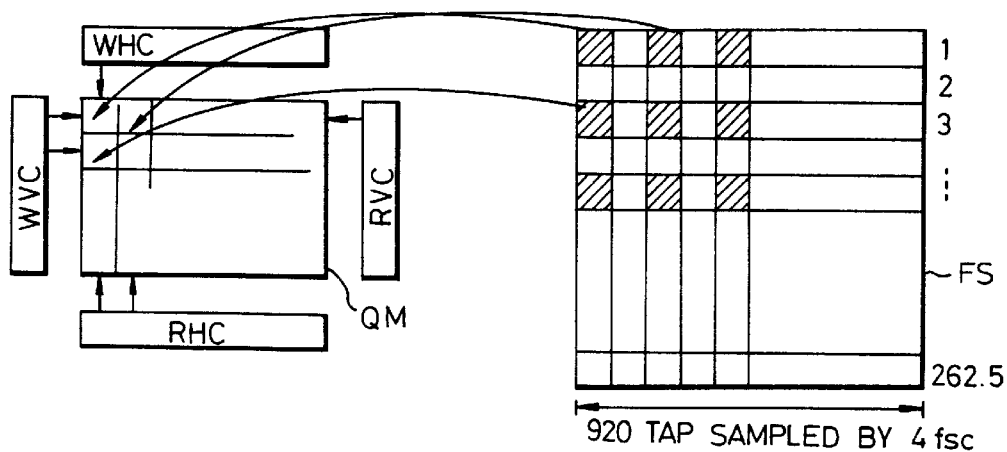

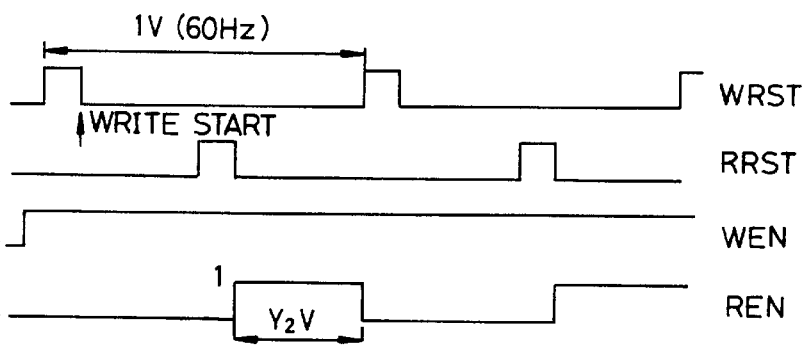

FIG. 3A (PRIOR ART) WRST
FIG. 3B (PRIOR ART) RRST
FIG. 3C (PRIOR ART) WEN
FIG. 3D (PRIOR ART) REN

FIG. 4
(PRIOR ART)

| MODE | GRAPHIC | TEXT 1 | TEXT 2 |
|---|---|---|---|
| HORIZONTAL FREQUENCY | 31.47 KHz | 31.47 KHz | 31.47 KHz |
| VERTICAL FREQUENCY | 59.95 Hz | 70.07 Hz | 70.07 Hz |
| HORIZONTAL RESOLUTION | 640 DOT | 640 DOT | 640 DOT |
| VERTICAL RESOLUTION | 480 DOT | 400 DOT | 350 DOT |
| HORIZONTAL SYNCHRONIZING POLARITY | NEGATIVE POLARITY | NEGATIVE POLARITY | POSITIVE POLARITY |
| VERTICAL SYNCHRONIZING POLARITY | NEGATIVE POLARITY | POSITIVE POLARITY | NEGATIVE POLARITY |

PC (NON-INTERLACED SCANNING)

TV (INTERLACED SCANNING)

PICTURE-IN-PICTURE TYPE VIDEO SIGNAL PROCESSING CIRCUIT AND METHOD OF USING THE SAME FOR A MULTI-PICTURE DISPLAY CIRCUIT

BACKGROUND OF THE INVENTION

1. Field of the Invention

This invention relates to a picture-in-picture (PIP) type video signal processing circuit and a method of using the same for a multi-picture display circuit in which vertical and horizontal frequencies of a sub-picture video signal are automatically synchronized with a main-picture video signal.

2. Description of the Prior Art

Generally, a PIP type video processing circuit has been provided in a TV and a sub-channel picture, converted to a predetermined size by the PIP type video processing circuit, is superimposed on, or displayed within a main-channel picture in a display screen region of the TV. Accordingly, a user can display two pictures simultaneously, the main-channel picture and the sub-channel picture, on a display screen. Further, the TV having the PIP type video signal processing circuit and video cassette recorder (VCR) have been also combined so that a program is on a desired channel may be recorded by the VCR while such program also being displayed on the picture screen region of the TV, or so that a program on one channel can be recorded by the VCR while a program on different channel is displayed on the picture screen region.

Meanwhile, a TV combined with a PC having the PIP type video processing circuit has been disclosed in the field. Accordingly, both the RGB (red, green, blue) video signal provided from the TV and the VGA (video graphics array) video signal provided from the PC are selectively displayed on the main-picture and sub-picture regions of the display screen, respectively, in the TV combined with the PC so that the user can operate the PC while watching the TV.

FIG. 1 is a block diagram of a conventional PIP type video processing circuit utilizing a luminance/color difference signal switching method.

Referring to FIG. 1, the conventional PIP type video processing circuit includes a color decoder 1 for decoding luminance signal Y and chrominance signal C separated from a sub-picture video signal into a predetermined color model (YUV), an analog/digital (A/D) converter 2 for converting luminance Y/color difference signals provided from the color decoder 1 into the digital signal, a sampling clock generator 7 for generating the sampling clock signal (4 fcs) by receiving the chrominance signal C and supplying them to the A/D converter 2, a video compressor 3 for compressing the sub-picture video signal provided from the A/D converter 2, a single-port memory 4 for storing the sub-picture video signal compressed by the video compressor 3, a synchronizing separator 5 for separating the horizontal and vertical synchronizing signals Hsync and Vsync from the luminance signal Y, a memory controller 6 for controlling reading and writing operations of the single-port memory 4 by the horizontal and vertical synchronizing signals Hsync and Vsync separated from the luminance signal Y, an outline signal generator 9 for generating a sub-picture outline signal by the horizontal and vertical synchronizing signals Hsync and Vsync provided from the memory controller 6, a video signal output section 8 for mixing the sub-picture video signal provided from the single-port memory 4 with the outline signal provided from the outline signal generator 9, a digital/analog (D/A) converter 10 for converting the digital video signal provided from the video signal output means 8 into an analog video signal, a video mixer 11 for mixing the sub-picture video signal (YsUsVs) outputted from the D/A converter 10 with a main-picture video signal (YmUmVm) processed through a dependent main video signal processing circuit, and a RGB decoder 12 for decoding the sub-picture video signal (YUV) into the video signal (RGB).

The operation of the conventional PIP type video signal processing circuit will now be explained with reference to FIG. 2 to FIG. 6.

If a user selects the main-picture and sub-picture from the two video signals which are provided from the TV and PC, respectively, by using a controller such as a key input device, a PIP type video signal processing circuit for the main-picture region which is combined with the TV processes the main-picture video signal and the PIP type video signal processing circuit for the sub-picture video signal processes the sub-picture video signal respectively.

In the PIP type video signal processing circuit, the luminance Y and chrominance signals C are separated from the sub-picture video signal. The luminance signal and the chrominance signal, as the sub-picture video signal, are decoded into a luminance signal and a color difference signal as a new color model (U.V) by the color decoder 1, and subsequently converted into the digital video signal by the A/D converter 2. At this stage, the sampling clock generator 7 generates the sampling clock signal (4 fsc) by receiving the chrominance signal C and provides the same to the A/D converter so that the signal is to be used as the sampling clock signal in A/D converting process.

Next, the digital video signal is compressed with the predetermined size to display in a display screen by the video signal compressor 3.

FIG. 2 is a view explaining a compressing principle compressing an entire screen to a ¼ screen for the sub-picture region.

Referring to FIG. 2, the video signal partially selected from an entire screen FS is written onto a ¼ memory QM by the address signal selectively controlled by a writing horizontal counter WHC, writing vertical counter WVC which are provided in the video signal compressor 3. However, when the actual screen will be displayed, proper coefficients are added to the selected pixels and upper, bottom, left, and right pixels of the selected pixels so that video components excluded from the selected lines may be compensated thereon.

The video signal compressed by such manner is stored in the single-port memory 4. At this stage, the synchronizing separator 5 separates the horizontal and vertical synchronizing signals Hsync. and Vsync. from the luminance signal Y detected from the sub-picture video signal. The memory controller 6 selectively generates and supplies a write reset signal WRST, read reset signal RRST, write enable signal WEN, and read enable signal REN as shown in FIGS. 3A–3D so that the reading and writing operations of the memory 4 are synchronized with the horizontal and vertical synchronizing signals Hsync. and Vsync.

The video signal provided from the memory 4 is inputted to one terminal of the video signal output section 8 by the control signal of the memory controller 6, and mixed with the outline signal provided from the outline signal generator 9. Subsequently, the mixed video signal is converted into analogue video signal of luminance signal Ys/color difference signals Us, Vs by the D/A converter 10. Such video signal of the luminance signal Ys/color difference signals Us, Vs are mixed with a luminance signal Ym/color difference signals Um, Vm in the video mixer 11 by the control signal provided from the outline signal generator 9. Subsequently the mixed video signal is provided to the color picture tube (CPT) of the TV combined with the PC after being decoded back to the original RGB color signal (RGB) by the RGB decoder 12.

In FIG. 2, the ¼ memory QM acts as a delay device to enable timing of the vertical synchronized PC video signal provided from an outside with the vertical synchronized TV video signal.

However, there are many vertical and horizontal frequencies for the TV and PC video signals. FIG. 4 shows representative frequency modes for the many frequencies.

Referring FIG. 4, in the event that the PC and TV video signal are displayed in the conventional PIP type video signal processing circuit, the luminance signal Y and chrominance signal C should be separated from the main-picture video signal, and decoded to luminance signal Y and color difference signal, and finally decoded back to the original TV color signal.

If the main-picture region is composed of the TV video signals, and the PC and TV video signals are displayed on the display screen, one horizontal line section 1H of the sub-picture video signal is reduced by half because the horizontal frequency of the PC video signal is twice that of the TV video signal. Accordingly, the half of the display screen shown in FIG. 5A is filled with noise and horizontally reduced by ½.

In another example, if the TV video signal is displayed on the main-picture region while the PC video signal is displayed on the sub-picture region, there is a problem as shown in FIG. 5B. In this example, the vertical frequency of the PC video signal in the VGA window mode is 60 Hz equal to the TV video signal. Further, in a VGA text mode, there are some problems as shown in FIG. 5A. Since the vertical frequency of the PC video signal is 70 Hz, the image of the sub-picture region rises to an upper side since two vertical synchronizing signals of the PC and TV video signals are not synchronized with each other.

In another example if the PC video signal is displayed on the main-picture region while the TV video signal is displayed on the sub-picture region, there is a problem as shown in FIG. 5C in contrast to FIG. 5A.

Meanwhile, it is noted that there is a difference between the VGA mode and the RGB mode in that the PC video signal is injected on the CPT by a non-interlaced method while the TV video signal is by an interlaced method. Accordingly, as shown in FIGS. 6A and 6B, the number of injection line is 449 lines for the vertical frequency 70 Hz of the PC video signal at the non-interlaced VGA text mode. When compared to 525 lines in the RGB mode, there is a significant difference. As a result, even though the sub-picture region is vertically fixed, a bottom section of the sub-picture region may be empty.

As described above, in the conventional PIP type video signal processing circuit in which the PC and TV video signals are simultaneously displayed on the display screen, the main-picture region is reduced or extended in horizontal direction. The conventional PIP type video signal processing circuit also displays an unstable sub-picture region due to the different vertical frequencies of the PC and TV video signals which are not synchronized with each other.

SUMMARY OF THE INVENTION

Therefore, the present invention has been devised to solve the aforementioned problems. It is an object of the present invention to provide a PIP type video signal processing circuit and a method of using the same for a multi-picture display circuit in which a sub-picture video signal is compressed with a predetermined pattern in accordance with a selected video mode, and vertical and horizontal frequencies of the sub-picture video signal are automatically synchronized to a main-picture video signal while the sub-picture video signal is outputted.

In order to achieve the above object, the present invention provides a picture-in-picture (PIP) type video signal processing circuit for a multi-picture display circuit, the circuit comprises a mode discriminator/timing generator for discriminating a mode in accordance with a synchronizing signal of a sub-picture video signal selected from input TV video signal or input PC video signal to produce a corresponding mode selection signal, producing a control signal for synchronizing horizontal and vertical frequencies of sub-picture video signal with a main-picture video signal, and separating horizontal and vertical synchronizing signals from the synchronizing signal of the sub-picture video signal, a video compressor for compressing the input TV video signal or the input PC video signal in accordance with the mode selection signal provided from the mode discriminator/timing generator, and a memory for storing and outputting the sub-picture video signal provided from the video compressor.

In order to achieve the object, the present invention also provides a method of processing a picture-in-picture (PIP) type video signal for a multi-picture display circuit, the method comprising the steps of a) selecting the input TV video signal and input PC video signal as main-picture and sub-picture video signals, respectively, or vice versa, b) discriminating a mode by receiving a synchronizing signal of the sub-picture video signal, c) compressing the sub-picture video signal in accordance with the discriminated mode, d) storing the compressed sub-picture video signal, e) synchronizing a reading period of the sub-picture video signal with the main-picture video signal when the stored sub-picture video signal is outputted, and f) mixing the main-picture video signal and sub-picture video signals each other.

BRIEF DESCRIPTION OF THE DRAWINGS

The above object, other features of the present invention will become more apparent by describing the preferred embodiment thereof with reference to the accompanying drawings, in which:

FIG. 2 is a view explaining a general video compressing principle for a sub-picture.

FIGS. 3A–3D are waveforms of each control signal used in video compressing operation as shown FIG. 2.

FIG. 4 is a table illustrating representative horizontal and vertical frequencies of an original PC video signal.

DETAILED DESCRIPTION OF THE PREFERRED EMBODIMENT

The preferred embodiment of the present invention will now be explained with reference to the accompanying drawings.

Figure 1:
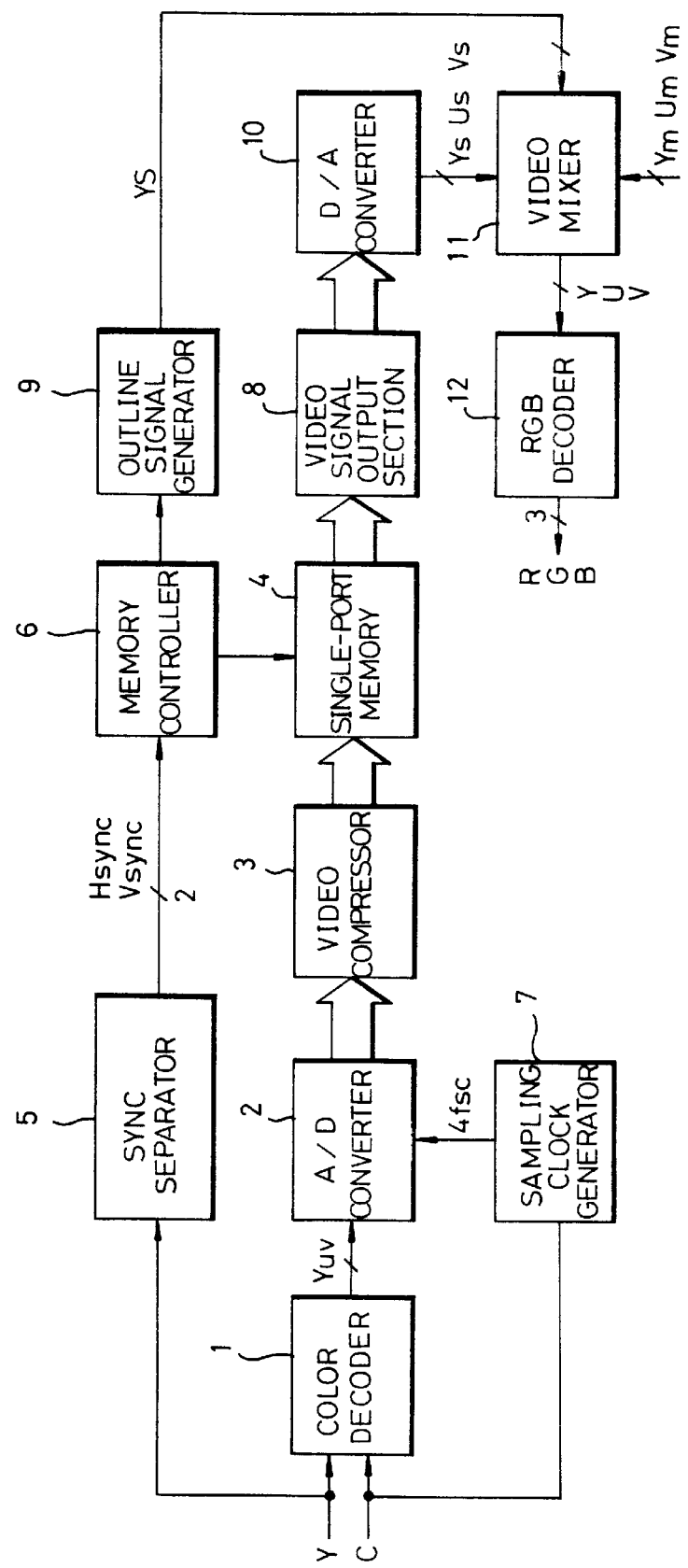
FIG. 1 is a block diagram showing a conventional PIP type video signal processing circuit.
Figure 5A:
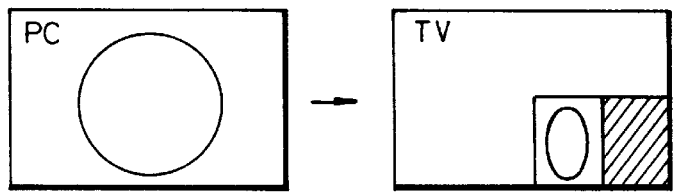
FIG. 5A is a view showing a PC display screen of VGA window mode displayed on a TV.
Figure 5B:
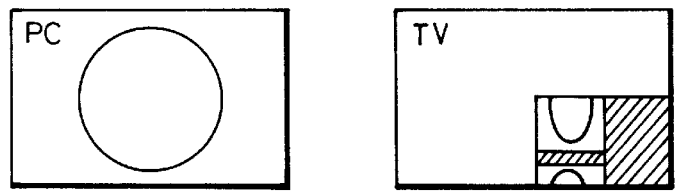
FIG. 5B is a view showing a PC display screen of VGA text mode displayed on a TV.
Figure 5C:
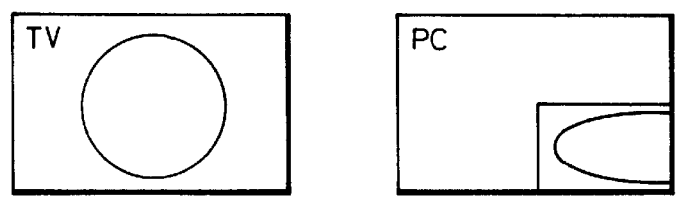
FIG. 5C is a view showing a PC display screen of a TV displayed on a PC.
Figure 6A:
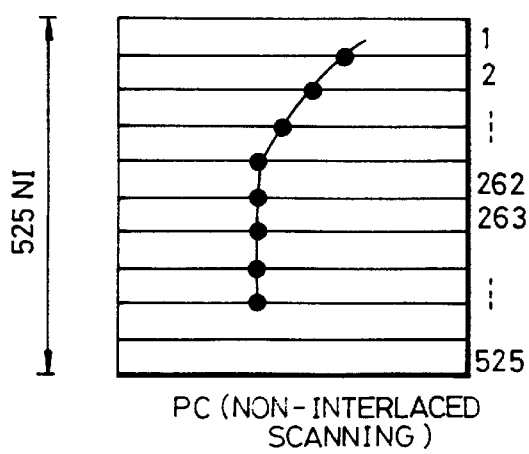
FIG. 6A is a view showing a status of a display screen injected by a non-interlaced method.
Figure 6B:
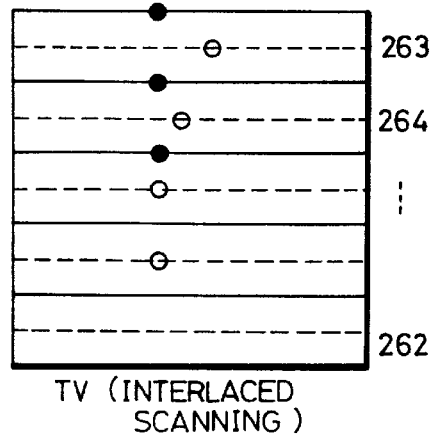
FIG. 6B is a view showing a status of a display screen when the video signal as shown in FIG. 6A is injected by an interlaced method.
Figure 7:
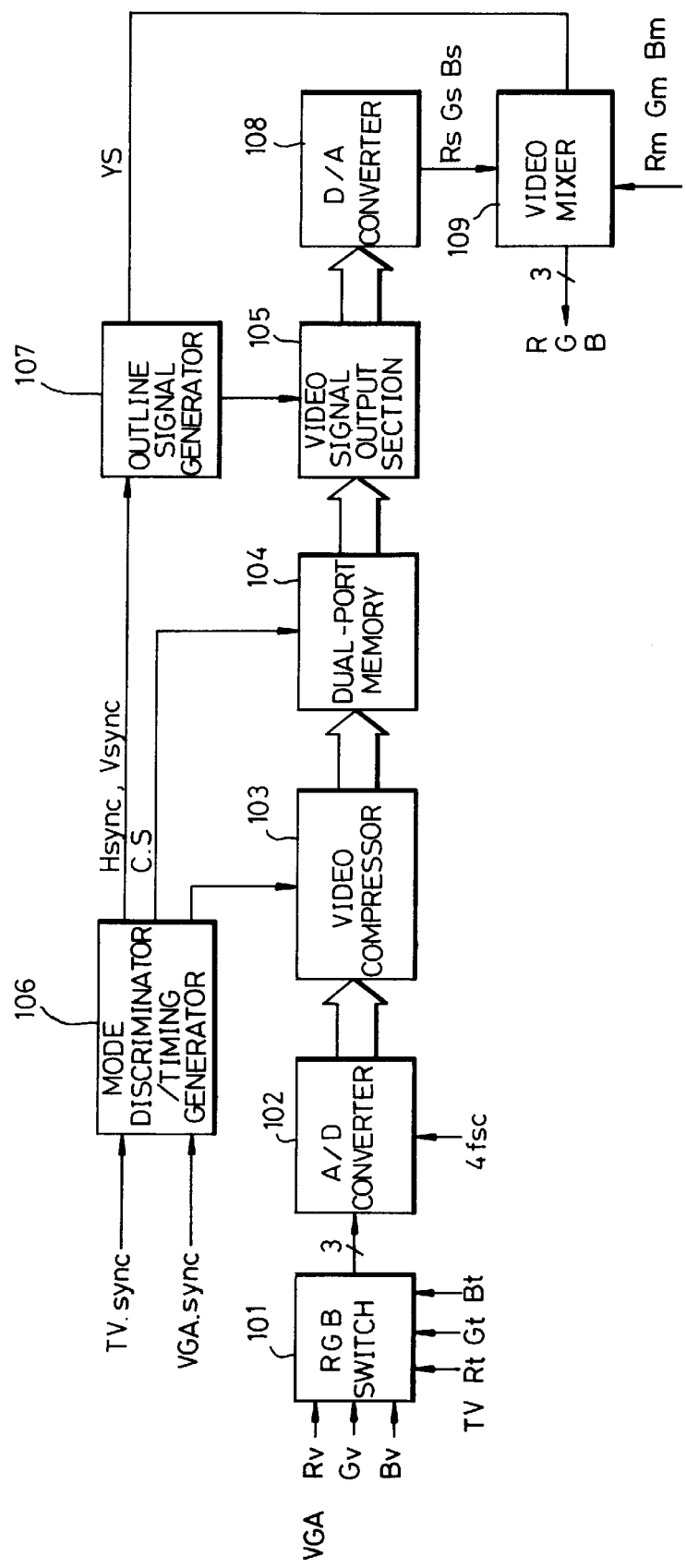
FIG. 7 is a block diagram showing a PIP type video signal processing circuit according to the present invention.

FIG. 7 is a block diagram showing a PIP type video signal processing circuit according to the present invention.

Referring to FIG. 7, the PIP type video signal processing circuit according to the present invention comprises a RGB switch 101 for selectively switching one of original color signals (Rt, Gt, Bt) provided from a TV or original color signals (Rv, Gv, Bv) provided from a PC in order to select a sub-picture video signal, an analog/digital (A/D) converter 102 for converting an analog video signal selected from the RGB switch 101 into a digital video signal for the sub-picture, a mode discriminator/timing generator 106 for discriminating a mode in accordance with a synchronizing signal of the sub-picture video signal to produce a corresponding mode selection signal SEL, producing a control signal for synchronizing horizontal and vertical frequencies of sub-picture video signal, during the sub-picture video compression, and during the read and write cycles of the compressed sub-picture in memory with the main-picture video signal, and separating horizontal and vertical synchronizing signals Hsync and Vsync from the synchronizing signal of the sub-picture video signal, a video compressor 103 for compressing the input TV video signal or PC video signal with a predetermined pattern in accordance with the mode selection signal SEL provided from the mode discriminator/timing generator 106, a dual-port memory 104 for storing the sub-picture video signal provided from the video compressor 103 and outputting the sub-picture video signal by the synchronizing control signal C.S provided from the mode discriminator/timing generator 106, an outline (border) signal generator 107 for generating an outline signal for the sub-picture whose size correspondings to the sub-picture in accordance with the horizontal and vertical synchronizing signals Hsync and Vsync provided from the mode discriminator/timing generator 106, and a video signal output section 105 for mixing the sub-picture video signal provided from the dual-port memory 104 with the outline signal provided from the outline signal generator 107 to output the mixed video signal, a digital/analog (D/A) converter 108 for converting the digital video signal provided from the video signal output section 105 into an analog video signal for the sub-picture, a video mixer 109 for mixing the sub-picture video signal Rs, Gs, Bs provided from the D/A converter 108 with a main-picture video signal Rm, Gm, Bm processed independent processing circuit by a control signal Y.S outputted from the outline signal generator 107.

The operation and effects of the present invention as constructed above will now be explained with reference to FIG. 2, FIG. 7 through FIGS. 9A–9C.

One of either the original TV color signal (Rt, Gt, Bt) provided from the TV or the original PC color signal (Rv, Gv, Bv) provided from the PC is selectively selected by the RGB switch 101 and then the sub-picture video signal is converted into the digital video signal by the A/D converter 102. At this time, a frequency of 4 fcs (a subcarrier frequency of a color signal) is supplied to the A/D converter 102 as a sampling clock signal.

The sub-picture video signal converted into the digital video signal is compressed by the video compressor 103 using the conventional compressing method. Thus, it will be performed by the same principle shown in FIG. 2, and one of three types of compressing modes are applied there.

The mode selection signal SEL, which can determine compressing operation mode of the video compressor 103, is provided from the mode discriminator/timing generator 106 selectively receiving the input PC and TV synchronizing signals PC. Sync and TV. Sync, and subsequently the sub-picture video signal compressed with determined mode is stored in the ¼ memory QM.

The dual-port memory 104 is provided with independent input and output ports and the memory controlling signal CS, timing signals such as vertical/horizontal count signal, reset signal RST, write enable signal WEN, read enable signal REN are controlled by not only the mode discrimination of the inputted original PC color signal (Rv, Gv, Bv) but also a :micro-computer provided in the TV combined with the PC.

Further, the outline signal generator 107 selectively generates the sub-picture outline signal according to 60 or 70 Hz modes after receiving the horizontal and vertical synchronizing signals Hsync and Vsync provided from the mode discriminator/timing generator 106. The outline signal is provided to the video signal output section 105 so that the outline signal is combined with the outline portions of the sub-picture video signal.

Such sub-picture video signal is provided from the video signal output section 105 to the D/A converter 108 so as to convert the digital video signal into the analog signal of the original TV color signal (Rs, Gs, Bs) for the sub-picture region, and subsequently mixed with the original TV color signal (Rm, Gm, Bm) for the main-picture region in the video mixer 109 by the control signal YS provided from the outline generator 107.

The synchronizing error of the video signals of the main-picture and sub-picture regions can be overcome by using the dual-port memory. Thus, the writing period of the video signal in the memory 104 is synchronized with the sub-picture video signal, while the reading period is synchronized with the main-picture video signal.

Now, the video compressing processing which is one of subject matters of the present invention will be explained hereinafter.

Figure 8A:
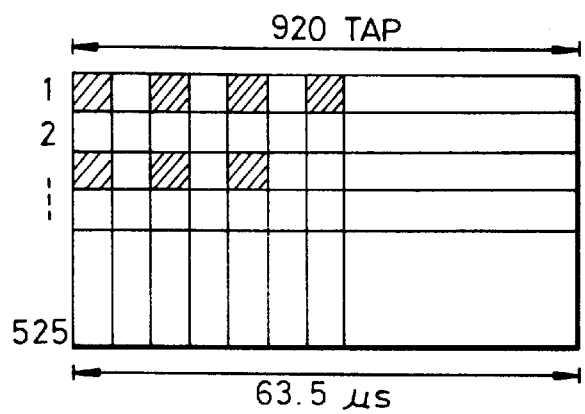
FIG. 8A is a view explaining a video compressing operation when a TV video signal as a sub-picture is displayed on a TV display-screen.
Figure 9A:
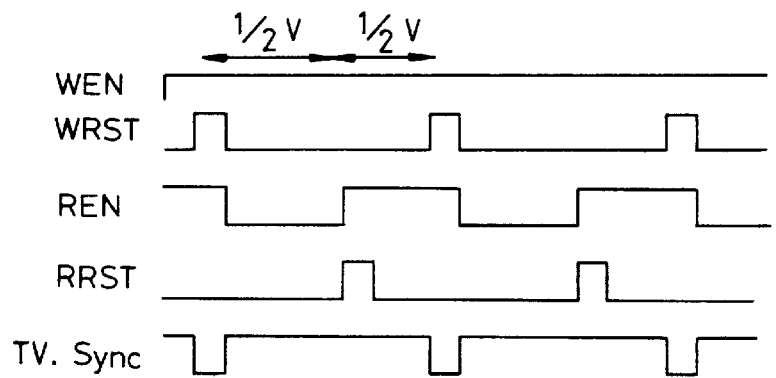
FIGS. 9A–C are waveforms of each control signal used in video compressing operation as shown FIGS. 8A–8C.

FIG. 8A is a view explaining a video compressing operation when a TV video signal as a sub-picture is displayed on a TV display-screen. The compressing principle of this case is the same as the conventional method. For example, the video signal sampled by 4 fcs can be expressed as one horizontal line having about 920 video pixels. If the sub-picture region is determined to be ¼ of the size for the main-picture region, it is preferable to select merely one pixel from the 4 pixels. FIG. 9A shows each control signal, timing signal such as write enable signal WEN, write reset signal WRST, read enable signal REN, read reset signal RRST, and TV synchronizing signal TV. sync, used or applied in video compressing operation. The write and read periods of the video data are the same at 60 Hz and there are no problems in performing its operation on the memory.

Actually, to improve the enhancement of the screen quality of the sub-picture region, a low-pass filtering is horizontally performed by using a tap memory and vertically performed by using a line memory so that the video information not selected during the compressing operation are compensated thereon to a certain extent.

Figure 8B:
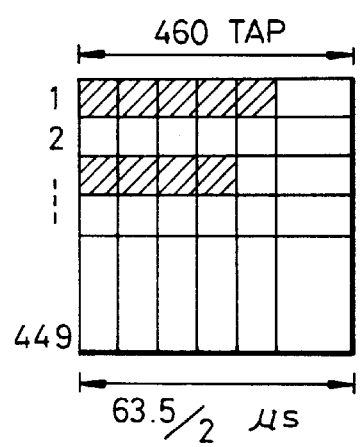
FIG. 8B is a view explaining a video compressing operation when a PC video signal of VGA text mode as a PIP type-picture is displayed on a TV display-screen.

FIG. 8B is a view explaining a video compressing operation when a PC video signal of VGA text mode as sub-picture is displayed on a TV display-screen. In this mode, the horizontal frequency of the PC video signal is 31.5 KHz which is twice that of the TV video signal and the pixels should not be horizontally reduced by ½ since it is considered that a section of the horizontal line 1H is 63.5/2 $\mu$s. Simply, by eliminating even or odd line of the PC video signal, the non-interlaced PC video signal can be converted into the TV video signal injecting so that the resolution may be maintained as it is.

Figure 9B:
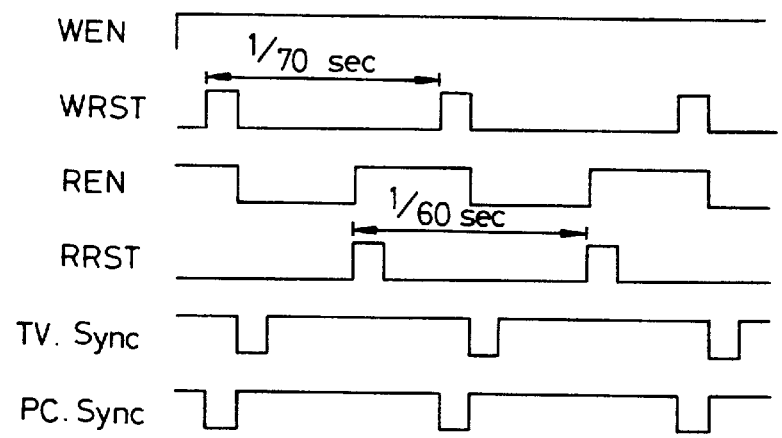

FIG. 9B shows each control signal, timing signal such as write enable signal WEN, write reset signal WRST, read reset signal RRST, TV synchronizing signal TV. Sync, PC synchronizing signal PC.Sync used in video compressing operation. It is noted that the write period of the video signal should be at 70 Hz as the same frequency of the VGA video signal and the read period should be 60 Hz corresponding to the vertical frequency of the TV video signal. Meanwhile, the VGA window mode having 60 Hz is easier to understand in contrast to the above described mode.

Figure 8C:
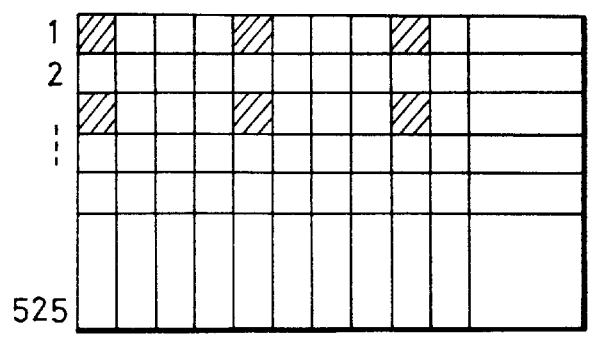
FIG. 8C is a view explaining a video compressing operation when a TV video signal as a sub-picture is displayed on a PC display-screen.
Figure 9C:
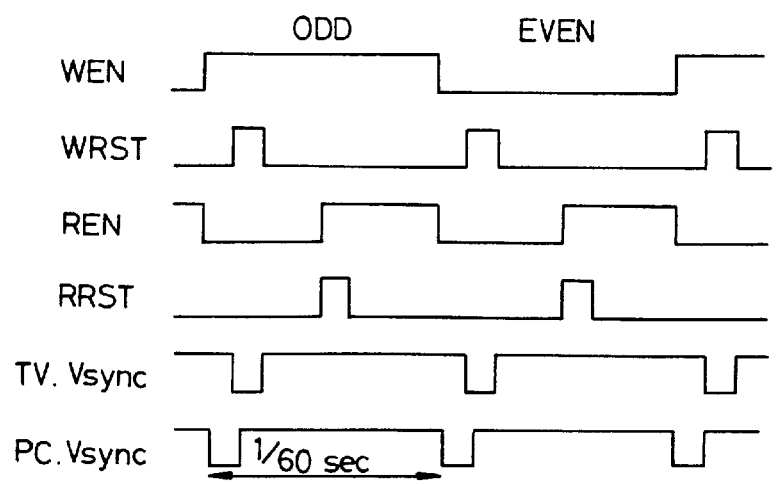

FIG. 8C is a view explaining a video compressing operation when a TV video signal as the sub-picture is displayed on a PC display-screen of the VGA mode. At this time, the status of the display picture is the reverse of the display screen shown in FIG. 8B, and FIG. 9C shows each control signal used in video compressing operation.

In the preferred embodiment of the present invention, the dual-port memory 104 provides independent input and output ports for simultaneously performing data input and output operation. In contrast to a single-port memory, the two ports protect against a problem that can be caused when the writing and the reading memory byte addresses cross each other since the write and read ports are different from each other.

As described above, in the PIP type video signal processing circuit according to the present invention, when the sub-picture video signal is selectively selected from the TV video signal provided from the TV or the PC video signal provided from the PC, and then compressed in accordance with the mode of the sub-picture video signal, a writing period of the sub-picture video signal is synchronized with a period of the sub-picture video signal, while a reading period is synchronized with a period of the main-picture video signal. Accordingly, more stable sub-picture can be displayed on the display screen thereof.

What is claimed is:

1. A picture-in-picture (PIP) video signal processing circuit for a multi-picture display circuit, the circuit comprising:

a mode discriminator/timing generator for discriminating a mode in accordance with a synchronizing signal of a sub-picture video signal selected from input TV video signal or input PC video signal to produce a corresponding mode selection signal, producing a control signal for synchronizing horizontal and vertical frequencies of sub-picture video signal with a main-picture video signal, and separating horizontal and vertical synchronizing signals from the synchronizing signal of the sub-picture video signal;

a video compressor for compressing the input TV video signal or the input PC video signal in accordance with the mode selection signal provides from the mode discriminator/timing generator;

a memory for storing and outputting the sub-picture video signal provided from the video compressor;

an outline generator for generating an outline signal for the sub-picture whose size corresponds to the sub-picture; and a video signal output section for mixing the sub-picture video signal provided from the memory with the outline signal provided from the outline signal generator to output the mixed video signal.

2. A picture-in-picture (PIP) video signal processing circuit for a multi-picture display circuit, the circuit comprising:

a mode discriminator/timing generating means for discriminating a mode in accordance with a synchronizing signal of a sub-picture video signal selected from input TV video signal or input PC video signal to produce a corresponding mode selection signal, producing a control signal for synchronizing horizontal and vertical frequencies of sub-picture video signal with a main-picture video signal, and separating horizontal and vertical synchronizing signals from the synchronizing signal of the sub-picture video signal;

means for compressing the input TV video signal or the input PC video signal with a predetermined pattern in accordance with the mode selection signal provided from the mode discriminator/timing means;

memory means for storing and outputting the sub-picture video signal provided from the means for compressing;

means for generating an outline signal for the sub-picture whose size corresponding to the sub-picture in accordance with the horizontal and vertical synchronizing signals provided from the mode discriminator/timing generating means; and a video signal output section for mixing the sub-picture video signal outputted from the memory means with the outline signal outputted from the outline signal generator to output the mixed video signal.

3. A method of processing a picture-in-picture (PIP) video signal for a multi-picture display circuit, the method comprising the steps of:

selecting the input TV signal and input PC video signal as main-picture and sub-picture video signals, respectively, or vice versa;

discriminating a mode by receiving a synchronizing signal of the sub-picture video signal;

compressing the sub-picture video signal in accordance with the discriminated mod;

storing the compressed sub-picture video signal;

synchronizing a reading period of the sub-picture video signal with the main-picture video signal when the stored sub-picture video signal is outputted;

mixing the main-picture video signal and the sub-picture video signal with each other;

generating an outline signal for the sub-picture video signal after the sub-picture video signal synchronizing step; and mixing the sub-picture video signal with the outline signal.

4. A picture-in-picture (PIP) video signal processing circuit for a multi-picture display circuit, the circuit comprising:
- a mode discriminator/timing generator adapted to:
  - discriminate a mode of a synchronizing signal of a sub-picture video signal having an outline signal to produce a mode selection signal;
  - produce a control signal adapted to synchronize a horizontal and vertical frequency of a PC signal with a corresponding horizontal and vertical frequency of a TV video signal; and
  - separate horizontal and vertical synchronizing signals from the synchronizing signal of the sub-picture video signal;
- a video compressor adapted to compress an input signal to the sub-picture video signal in accordance with the mode selection signal, wherein the input signal is at least one of a PC signal and a TV signal; and
- a memory connected to video compressor.

* * * * *